United States Patent [19]

Sziede

[11] Patent Number: 4,644,607
[45] Date of Patent: Feb. 24, 1987

[54] DEVICE FOR APPLYING A STRAND OF SAUSAGE OR THE LIKE TO A SMOKING ROD

[75] Inventor: Alfred Sziede, Geradstetten, Fed. Rep. of Germany

[73] Assignee: Karl Schnell, Fed. Rep. of Germany

[21] Appl. No.: 821,598

[22] Filed: Jan. 23, 1986

[30] Foreign Application Priority Data

Jan. 24, 1985 [DE] Fed. Rep. of Germany ....... 3502274

[51] Int. Cl.[4] ...................... A22C 11/00; A22C 15/00
[52] U.S. Cl. ........................................ 17/45; 17/1 F; 17/33; 17/44.4
[58] Field of Search ................. 17/1 F, 1 R, 44.4, 33, 17/34, 45

[56] References Cited

U.S. PATENT DOCUMENTS 4,339,846  7/1982  Zamiara ............................ 17/44.4 X
4,494,276  1/1985  Trottmann ....................... 17/44.4 X
4,547,931  10/1985  Staudenrausch et al. ....... 17/44.4 X

FOREIGN PATENT DOCUMENTS

3202026  8/1983  Fed. Rep. of Germany ....... 17/44.4

Primary Examiner—Willie G. Abercrombie
Attorney, Agent, or Firm—John J. McGlew

[57] ABSTRACT

In order to be able to fully automatically deposit a sausage strand (1) in turns on a smoking rod (2), the strand of sausages (5) reeled off a portioning device (4) with the aid of a rotating carrier finger (12) is first "wound up" on a feeder arm (14). This is done with the aid of a movable feeder device (18) of feeder arm (14), particularly and endless chain, and which in a preferred manner is provided with carrier teeth (22). During the retraction of the feeder arm (14) in the direction of arrow (25), the feeder device (18) is driven in the opposite direction. Thereby one turn after the other is transferred to the smoking rod (2) situated under the feeder arm (14). The smoking rod is situated on a rotating support (26), in which several smoking rods evenly arranged along the circumference can be exchanged with the aid of a delivery device (46), a transfer device (41) and a receiver (38). The removal of the loaded smoking rods is preferably done by hand.

28 Claims, 14 Drawing Figures

DEVICE FOR APPLYING A STRAND OF SAUSAGE OR THE LIKE TO A SMOKING ROD

FIELD AND BACKGROUND OF THE INVENTION

The present invention relates in general to devices for applying a reeled-off strand of sausage casing filled with a pasty medium onto a rod-shaped carrier and in particular to a new and useful device for applying a smoking rod.

Diverse pasty mediums are stuffed into natural intestines or artificial casings with the aid of sausage machines or portioning devices, respectively, and are subdivided into portions. In the latter case, a continuous strand of sausage is formed, made up of sausages of equal length, the total length of which is determined by the length of the rolled up sausage casing. In sausage manufacturing, in particular, further processing may follow after the sausage forming step, for example, smoking of the sausages. Since this is the principal area of application of the device of the invention, only sausages will be mentioned hereinafter, in the sense of sausage casings filled with sausage mixture, without this being deemed restrictive of the application of the invention.

For smoking, the sausages must be brought to a smoking chamber. For the optimal utilization of the latter, the sausages must be put in place in as ordered as possible.

SUMMARY OF THE INVENTION

The present invention provides a device of the aforesaid type, with which a uniform application onto a rod-shaped carrier, especially a so-called smoking rod, is made possible effecting this automatically, quickly and in a space-saving manner.

Accordingly an object of the present invention is to provide a device for applying a reeled-off strand of sausage casing filled with a pasty medium onto a rod-shaped carrier, in particular a sausage strand onto a smoking rod, wherein an eccentric carrier finger rotates around a longitudinal axis of the reeled-off strand as the strand moves through the outlet of a portioning device. A feeder arm is arranged coaxial to the axis of rotation of the carrier finger and is displaceable relative to the rod-shaped carrier which is situated under the feeder arm. The feeder arm is provided with a feeding device that is movable along its longitudinal direction for moving the reeled-off and wound sausage casing onto the rod-shaped carrier.

The filled sausage casing, subdivided into equal parts, mostly exits the portioning device of the sausage machine in a horizontal direction. In particular, the sausage strand is gripped directly at the egress by the carrier finger which rotates around the geometric axis of each exiting sausage and thereby grips under the sausage strand in evenly spaced distances. With each rotation of the carrier finger another sausage of the sausage strand or another pair of ends of neighboring sausages is gripped from below. In this manner, uniform turns of the sausage strand are formed with the aid of the carrier finger. The sausage finger rotates advantageously around the end of the feeder arm corresponding to it. When it is under this feeder arm end, it releases the formed turn and the latter is then taken up by the feeder arm. As soon as it comes up again, it again grips the sausage strand and thereby forms another turn. The rotating speed is, of course, adjusted to the length of the sausage, in order to obtain turns with a certain number of sausages, to which end the sausage-ends adjoin each other laterally at the feeder arm. Expediently, each turn is made up of an even number, e.g., of four sausages. Once the entire sausage strand is "wound onto" the feeder arm in this manner, the carrier finger can be switched off. On the other hand, however, the feeder device of the feeder arm must be put in motion intermittently during the formation of the individual turns, or it must be kept in constant motion, so that during the formation of each new turn the feeder arm-end corresponding to the carrier finger will be free. It can thus be seen that the size of the turns and their lateral distance must be selected in such a manner that all the turns of a sausage strand of present length will find a place on the feeder arm.

The turns must then be transferred from the feeder arm to the below situated rod-shaped carrier as evenly as possible, i.e., spaced laterally equidistantly. This is done in that the feeder arm is moved from its extended position to its retracted position, i.e., it is pulled back along the rod-shaped carrier situated below. During this, the feeder device must naturally not move in the feed direction necessary for the forming of the turns. The individual turns are transferred to the rod-shaped carrier one after the other in a sequence that to some extent is in the reverse order of the forming of the turns. The carrier can then be transported to the smokehouse or the like in a suitable manner, i.e., by hand or by means of an additional device.

A particularly preferred embodiment of the invention provides that the feeder device of the feeder arm be movable optionally in opposite directions. When forming the individual turns, it moves in one direction and when transferring these turns to the rod-shaped carriers it is driven in the opposite direction. This measure makes possible a particularly clean transfer to the rod-shaped carrier with uniform lateral distances, which in the last analysis also assures a good smoking result.

The feeder device of the feeder arm has, in a very advantageous way, a continuous rotary feeder element. Such feeder elements are known in a large variety of types. A preferred embodiment of the invention provides that the feeder element of the feeder device of the feeder arm is constituted of a chain belt, with the chain provided with carrier teeth along at least a part of its length. The latter will ensure maintenance of a preset distance between the separate turns and the even transport along the feeder arm of each of the turns formed, so long as still additional turns are created. The feeder teeth can advantageously be of one piece with the chain-links or with chain link parts, respectively. As a result, an additional assembly effort is eliminated. Moreover, the chain belt need not be equipped with feeder teeth along its entire length. It is basically sufficient if only one chain segment is provided with feeder teeth. In this case, one must see to it that when the first turn is formed, the first tooth or the first toothgap, respectively, be coordinated with the end of the feeder arm on the carrier-finger side.

In a very expedient manner, the carrier finger can be driven intermittently. Switching on and off must be coordinated with the sausage strand's speed of egress from the portioning device. In addition, switching on is appropriately effected when the carrier finger is coordinated or can be coordinated with a neighboring pair of sausage-ends. The carrier finger or a feeder head carrying it makes, for example, one rotation after two, three, four or more sausages. An even number of sausages is to be given preference, especially for long and heavy sausages. In this sense, another variant of the invention is characterized in that the cycle of a carrier finger drive can be synchronized with the cycle of a portioning device operating according to a cycle. It is not necessary, however, that the portioning device operate in cycles; rather, portioning devices are also known in which the formation of sausage-ends takes place continuously, to wit, without a switching on and off, in cycles, of the end-forming device. In this case, the time interval between two formations of sausage-ends takes the place of one cycle of the portioning device.

A further development of the invention provides that the feeder device of the feeder arm can be driven in cycles or continuously by means of a geared motor.

The feeder device of the feeder arm can be driven, according to another preferred embodiment of the invention, by means of an adjustable fast-cycle drive, particularly one arranged at its distant from the carrier finger. By the adjustable form, an exact adaptation to different lengths of sausage and required turn sizes is made possible. Similarly, the distance of the sausage strand can be continuously adjusted on the carrier, so that a length of sausage strand can be evenly placed onto the entire carrier.

Another embodiment of the invention provides that the feeder arm is reciprocatingly movable by means of a geared motor which drives an endless drive chain or the like that is connected in particular with the end of the feeder arm that is distant from the carrier finger.

Another embodiment of the invention is characterized in that the free end of the feeder arm will slightly project above that of the rod-shaped carrier when the rolling-off strand is applied. Appropriately, the space arrangements are such that the free end of the feeder arm centrally penetrates the path of motion of the carrier finger, while the free end of the rod-shaped carrier exhibits a certain distance from this plane of motion of the carrier finger, which distance, for example, approximately corresponds to the diameter of a guide sprocket wheel for the chain belt of the feeder device, or is somewhat larger.

A further variant of the invention consists in that the rod-shaped carrier is removably attached to a rotatable mounting, especially a disc-shaped support, with the axis of rotation of the support being parallel to the longitudinal axis of the carrier. With the aid of this support, the rod-shaped carrier can be aligned exactly opposite the feeder arm. As soon as the rod-shaped carrier is "loaded," it can be removed from the feeder arm, also with the aid of the support, and thereby possibly detach it more easily and more conveniently. In addition, this opens up the possibility of bringing an additional rod-shaped carrier as quickly as possible into the operating position, so that one can leave sufficient time for detaching the previously loaded carrier. For example, the next rod-shaped carrier can be brought into operating position while a new roller up intestine is mounted on the sausage-filling tube of the sausage machine.

In a preferred embodiment of the invention, the support for the rod-shaped carrier has at least two, but particularly more, receivers for a carrier, uniformly arranged along a circle. When all receivers are occupied, then after six receptions, for example, after a 60° turn, the next rod-shaped carrier can be moved from a readiness to an operating position. In a very advantageous manner, the support for the rod-shaped carrier can be driven intermittently, thus, in the said exemplified embodiment, by a 60° angle in each instance. In a further development of the invention it is proposed that the support for the rod-shaped carriers be driven by means of a geared motor with brake. This makes possible a quick change and an exact positioning in relation to the feeder arm.

Another variant of the invention is characterized in that the support for the rod-shaped carriers is driven indirectly by means of a synchronous belt drive or the like, especially a geared synchronous belt drive. In this manner a suitable gear ratio can be selected and, moreover, the support can be placed in a suitable position.

According to an additional embodiment of the invention, this rod-shaped carrier can be inserted in a seat of the support by means of a receiver. This means that the rod-shaped carriers are not inserted into the support directly by hand, but rather mechanically controlled with the aid of a receiver, and at the correct moment. This support can also be used to remove a carrier bearing a sausage strand.

Another embodiment of the invention is characterized in that the receiver can perform an assembly motion in the longitudinal direction of the rod-shaped carrier, and a rotating motion at right angles thereto, with the receiver being coordinated with a transfer device in the first rotating end position and with a seat of the support in the second rotating end position. A pivoting angle of, e.g., 90° to 120° may exist between the two rotational end positions. If needed, it may be smaller or even somewhat larger. Thus, the rod-shaped carrier is not inserted into this seat by hand, but rather the loading is effected with the aid of a transfer device. Since the seat can perform both a rotating motion and a shifting motion, care must be taken that the rotating motion is carried through only when the seat is at a shifting distance from the support, if possible, at its maximum shifting distance. This means that the rod-shaped carrier to be inserted in the support will perform, after it is accepted from the transfer device, first a rotating motion and only subsequently an advancing motion in its longitudinal direction, which in the end brings it into the support. The latter may also be a insertion-support which will hold the rod-shaped carrier securely either by a controlled push-in motion or also in another way.

A further preferred embodiment of the invention consists in that the transfer device is in the form of a lifting device, which in one of its end-positions is coordinated with a feed device for the rod-shaped carriers and in its other, especially its upper end-position, is coordinated with the seat. The feed device accordingly receives the rod-shaped carrier not from an operator, but from the feed device. However, the latter is preferably loaded by hand with the rod-shaped carriers. It must also be designed in such a manner that it will deliver the rod-shaped carrier or the next following rod-shaped carrier to the transfer device in correct coordination. The lifting device may operate, e.g., with at least one pneumatic or hydraulic lifting cylinder. As a rule, compressed air is in any case required for sausage processing machines, so that a pneumatically actuated lifting device recommends itself in particular.

The feed device consists in a very advantageous manner of at least one, but preferably two, driven endless conveyor belts arranged laterally at a distance from each other, which can be driven at right angles to the longitudinal axis of the inserted rod-shaped carriers. Two conveyor belts have the advantage that at relatively narrow width and thus with small space requirement they can securely support the not exactly short rod-shaped carriers at their two end zones, and hold them during transport. At the same time, this offers the possibility for a further development of the invention, which consists in that the transfer device is situated between the two conveyor belts. This results in a compact design. In the event that the rod-shaped carriers are not placed at exactly right angles to the carrying strands of the feed device, a correct alignment in relation to the transfer device or lifting device, respectively, is nonetheless achieved, when according to another variant of the invention, a stop is provided for the rod-shaped carriers at the end of the carrying strand of the feed device. The deposited carrier will impact against this stop. If it is not immediately delivered to the lifting device, a second and additional rod-shaped carrier may run up against the carrier already adjoining the stop. In this manner, all the following carriers can be cleanly aligned.

Another advantageous embodiment of the invention is characterized in that the seat, especially at its end remote from the axis of rotation, has a controllable or automatic dead lock device. As soon as the rod-shaped carrier reaches the seat, the dead lock device holds it fast. It can be actuated by the end-phase of the transfer motion, for example, in that the rod-shaped carrier releases a spring-loaded latch or actuates a rotating or slidable locking bar. In a similar manner, the dead lock device can be opened again by the motion during transfer to the seat of the support. If required, an appropriate dead lock can also be provided for the lifting device.

Accordingly an object of the invention is to provide a device for applying a reeled-off strand of sausage casing or other filled casing, onto a rod-shaped carrier, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the following, the invention is described in detail with the aid of the drawing wherein.

DESCRIPTION OF THE PREFERRED EMBODIMENTS

Figure 9:
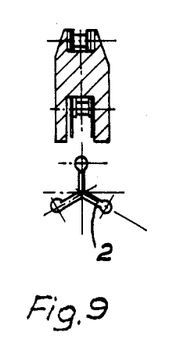
FIG. 9 is a sectional view taken along line IX—IX of FIG. 8.
Figure 10:
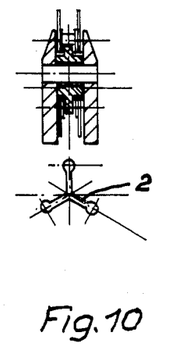
FIG. 10 is a sectional view taken along line X—X of FIG. 8.

As mentioned, the device serves the application of a reeled-off strand of a sausage casing filled with a pasty medium, especially a sausage mixture, onto a rod-shaped carrier. In particular, this device should serve to deposit a strand of sausage 1 in turns onto a smoking rod 2. According to FIGS. 9 and 10, the smoking rod has a specific cross-sectional form which can essentially be described as a three-pronged star with bulging, thickened prong-ends. In this manner, a foot formed by two prongs is created for the secure mounting of a smoking rod, which is advantageous for the automatic smoking rod transfer and, on the other hand, a kind of support strip which can easily reach between neighboring sausage-ends. In this manner, a well-ordered hanging of the sausage strand is obtained, which has been put in turns according to FIGS. 3 through 7, if the turns are selected in accordance with the length of the sausage and preferably a turn is formed of an even number of sausages, for example, of four sausages.

With the aid of a sausage machine 3 (shown in FIG. 1), the pasty medium—hereinafter mentioned is made only of sausage mixture or sausages, without this being intended restrictively—is filled into the artificial or natural sausage casing. A portioning device 4 divides the reeled-off sausage strand 5 into sausages 6, so that finally a sausage strand 1 is created. In the exemplified embodiment, the portioning device consists of two endless transport elements 7 and 8 arranged one above the other, namely chain belts in particular, each of which carries a squeezer plate at regular distances. Each two squeezer plates form a pair of squeezer plate 9, with which the sausage strand is divided into sausages, with a turn around the longitudinal axis taking place simultaneously, in order to obtain lasting sausage-ends.

The reeled-off sausage strand 1 penetrates the passage 10 of a feeder head 11, to which a carrier finger 12 is attached eccentrically. The strand also passes through finger 12. It rotates about the free end 13 of feeder arm 14, which penetrates its path of motion. Said feeder arm 14 is reciprocatingly movable in the direction of double arrow 15 in FIG. 4. At the start of the unreeling process, this free end penetrates, as aforementioned, the flight circle of carrier finger 12, which corresponds to one end-position of the feeder arm. In addition, the free end 16 of smoking rod 2 is preferably exceeded. According to FIGS. 8 and 9, both are in parallel arrangement, with the feeder arm 14 situated above the smoking rod 2. As can further be gathered from FIG. 1, the geometric axis of feeder arm 14 and the axis of rotation of feeder head 11 are coaxially arranged to each other and the geometric axis of sausage strand 1 is also arranged approximately coaxially thereto. The passage 10 of feeder head 11 is positioned directly before the outlet 17 of portioning device 4.

Figure 8:
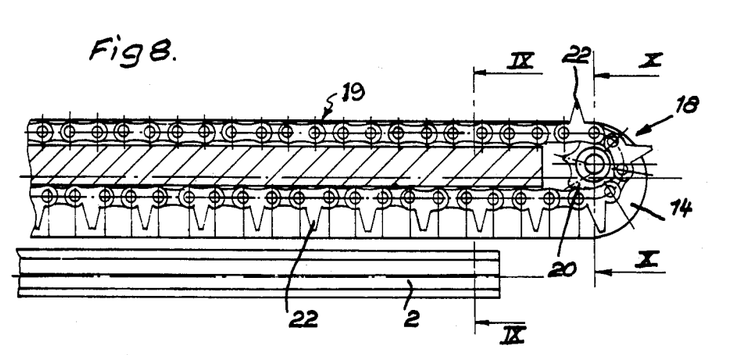
FIG. 8 is an enlarged detail taken at X in FIG. 1.

The feeder arm 14 is equipped with a feed device 18 (FIG. 8). Its direction of motion is in the longitudinal direction of the feeder arm. It has an endless rotating feeder element 19, which latter is preferably in the form of a chain which is rerouted by way of two sprocket wheels 20 arranged at both ends of the feeder arm. The feeder device 18 is preferably driven cyclically or also continuously by means of a geared motor 21. Both clockwise and counterclockwise rotations are possible. The speed is continuously variable. This motion is also symbolized by the double arrow 15 in FIG. 4. The chain belt carries carrier teeth 22 at least over part of its length. They are manufactured preferably in one piece with elements of a chain link. FIG. 8 shows the starting position of the chain belt prior to beginning the forming of turns in an embodiment provided with carrier teeth 22 over only a partial length of the chain belt.

Figures 1, 2, 3:
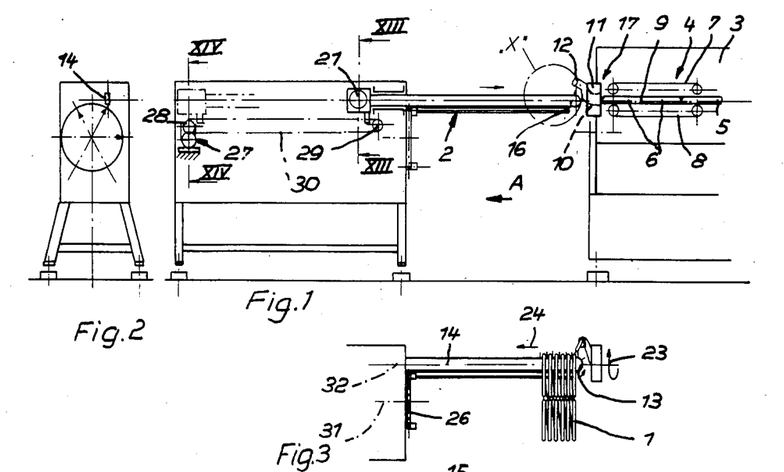
FIG. 1 is a side elevational view of the device according to the invention in schematic representation with a schematically indicated portioning device.
FIG. 2 is a front view of the device according to FIG. 1 as seen in the direction of arrow A.
FIGS. 3 to 7 are each detail side views essentially corresponding to FIG. 1, in different stages of application of a sausage strand to a smoking rod.
Figure 4:
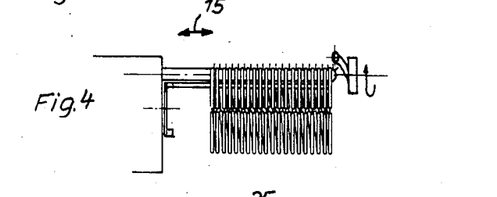
Figure 5:
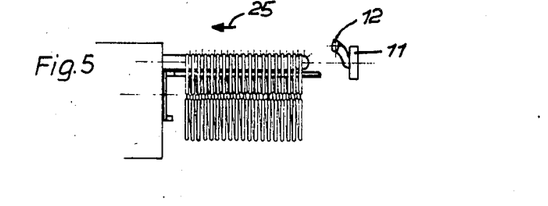
Figure 6:
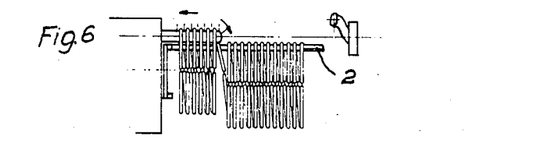
Figure 7:
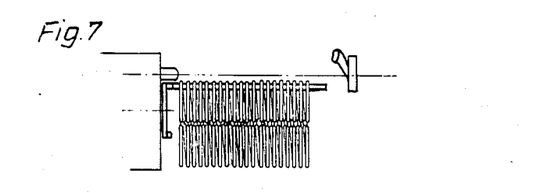

In the exemplified embodiment, the carrier finger 12 is advanced or rotated intermittently in the direction of arrow 23 (FIG. 3) after each four sausages. In this manner, turns comprising four sausages are created, which are at first deposited on feeder arm 14. To obtain a second distance of the turns, the feeder device 18 is advanced in the direction of arrow 24 at the required speed and, as has already been stated, intermittently. The start of placing the sausage strand on feeder arm 14 is shown in FIG. 3. When the entire sausage strand 5 has left the portioning device 4, all turns are placed on the feeder arm 14 (FIG. 4). The feeder arm is then retracted in the direction of arrow 25. FIG. 5 shows the start of this return lift. When the rod-shaped carrier or smoking rod 2, respectively, projects beyond the feeder arm 14 by, e.g., 10 cm (FIG. 5), the feeder device 18 is actuated in the opposite direction, i.e., counter to arrow 25. In this manner, one turn after another is transferred to the smoking rod 2, as illustrated by FIG. 6. When the entire sausage strand is deposited on the smoking rod, the feeder arm 14 assumes its retracted end position as shown in FIG. 7. The uniformly loaded smoking rod together with the sausage strand can then be removed.

By continuously variable speed of depositing from the feeder arm 14 onto the smoking rod 2, such depositing can be effected in tighter or wider distances than on the feeder arm. The distances on the feeder arm are always the same, e.g., 28.575 mm (3 × ⅜" strand division) given constant drive speed. It is necessary to deposit the sausage strand on the smoking rod at distances corresponding somewhat to its diameter (e.g., for a sausage diameter of 28 mm, the distance should be about 35 mm). In the case of smaller sausage diameters, e.g., 19 mm, the distance on the smoking rod should be about 25 mm, so that a correspondingly long sausage strand can be deposited evenly and utilizing the entire length of the smoking rod. Subsequently, a new smoking rod must be mounted on the support 26, or placed in the operating position as is described further below.

Figures 13, 14:
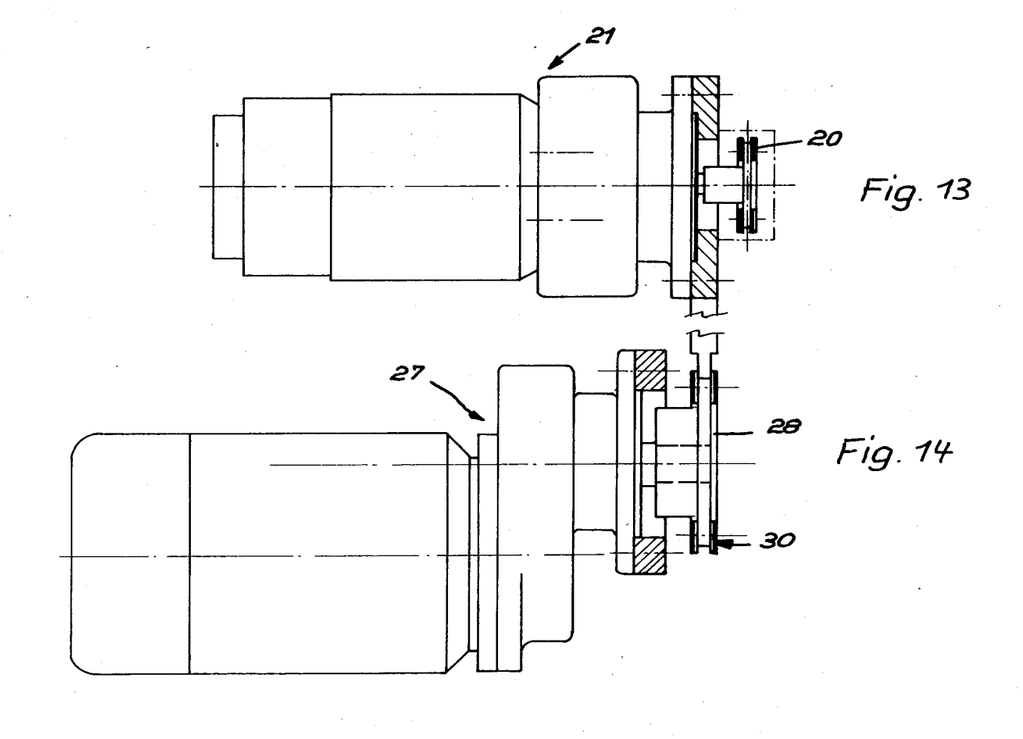
FIGS. 13 and 14 are enlarged representations of two drives of the device in the zone of lines XIII—XIII and XIV—XIV respectively of FIG. 1.

FIG. 13 shows the geared motor driving the feeder device 18. It is a component of the adjustable fast cycle drive not further illustrated. The feeder arm 14 is also reciprocatingly movable by means of a geared motor. It can be seen in FIG. 14 on an enlarged scale, and it also comprises an endless feed link 30, preferably also in the shape of a chain, guided by way of two pinions 28 and 29 (FIG. 1). Said link can also rotate clockwise and counterclockwise, in order to cause the reciprocating motion 15 of feeder arm 14.

Figure 11:
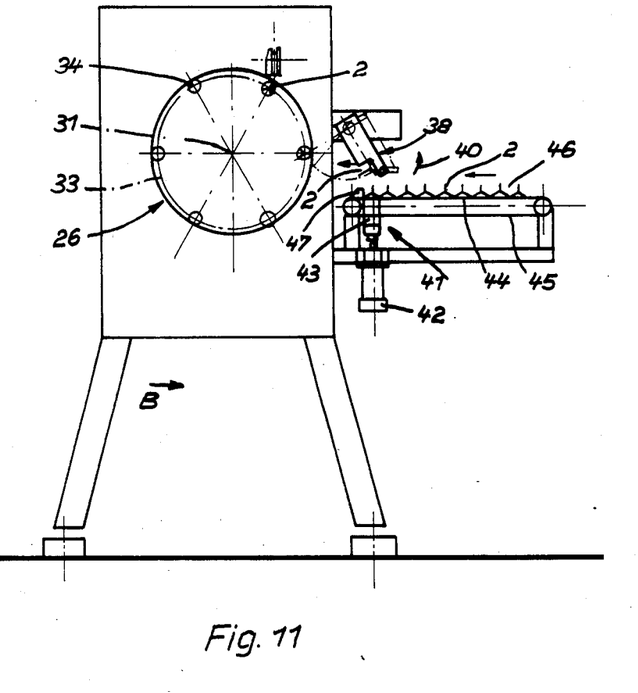
FIG. 11 is a view similar to FIG. 2, on a larger scale and with expanded development of the device.
Figure 12:
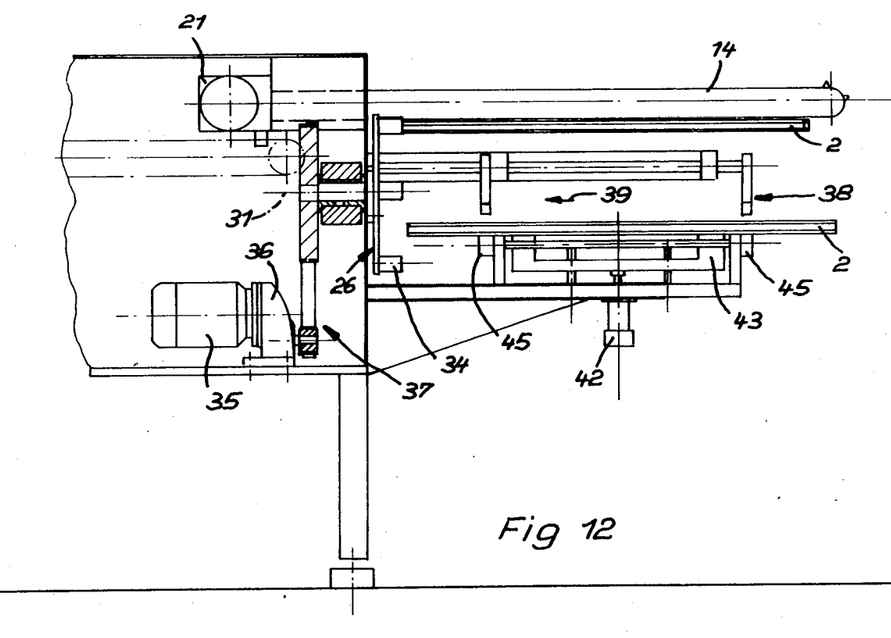
FIG. 12 is a sectional view of FIG. 11 taken in the direction of arrow B.

The axis of rotation 31 of support 26 runs parallel to the geometrical axis 32 of feeder arm 14, according to FIGS. 1, 3 and 11, and thereby also parallel to the longitudinal axis of smoking rod 2. It has at least two, but preferably more, seats 34 for each carrier 2, arranged evenly along a circle 33 (FIG. 11). It is driven intermittently, with the angle of rotation in the exemplified embodiment being 60° per cycle. A geared motor 35 with brake 36 as shown in FIG. 12, serves this purpose. However, the geared motor does not drive the support directly, but rather indirectly by way of a geared synchronous belt drive 37.

Each rod-shaped carrier 2 is inserted with the aid of a receiver 38 into seat 34 of the support. As a result, given the coaxial alignment of the smoking rod 2 to be inserted and the seat 34 provided for this, the receiver must be able to effect a delivery motion in the direction of arrow 39. After the smoking rod is inserted, it returns in the direction opposite to arrow 39 to the starting position, in order to pick up an additional smoking rod 2. Before that, however, it must execute a return swivel motion in the direction of arrow 40 (FIG. 11). Both the swivel and the delivery motion can be effected with the aid of pneumatic or hydraulic working cylinders.

When the receiver 38 has assumed its first swivel end-position shown in FIG. 11, it is coordinated with a transfer device 41. The latter is preferably in the form of a lifting device, and as a result is provided with an additional working cylinder 42. FIGS. 11 and 12 show the transfer device 41 in its bottom end position. Its support device 43 is then situated below the plane of the carrying endpiece 44 of an endless feeder link, in particular chain belt 45, of a delivery device 46. In the exemplified embodiment, it is not only a single chain belt 45, but a pair of chain belts 45 that is provided. The two chain belts of the latter are at such a distance from each other that support device 43 of the transfer device 41 can be accommodated between them. The latter is situated within the zone of the end of delivery device 46 that is assigned to the receiver 38, as illustrated in FIG. 11 of the drawings. A stop 47 is also arranged there, against which the smoking rods 2 run up, which can be deposited by hand on the delivery device 46. When the smoking rod 2 adjoining stop 47 is transferred in raised position to the receiver 38 and returns to the starting position, the delivery device 46 is put into motion briefly, in order to preliminarily transport the deposited smoking rods up to stop 47. The delivery device could also run constantly, when the smoking rod adjoins stop 47, and the pair of chain belts 45 slips through and additional smoking rods are pushed on. The changing of a new smoking rod 2 in the seat 34 of support 26 takes place advantageously while the rolled up sausage casing is mounted on the filler pipe of the sausage machine 3, so that no further loss of time is thereby incurred. To ensure that the delivered smoking rod 2 will remain on the receiver 38 when support device 43 of the transfer device 41 is retracted, said receiver has a locking device, not illustrated in detail, at that of its ends that is away from the axis of rotation. The locking device may be in such a form that it is actuated by the inserted smoking rod or by the end-phase of its motion, respectively. To release the locking device, the displacement motion in the direction of arrow 39 may be used in conjunction with a stationary tripping device.

While specific embodiments of the invention have been shown and described in detail to illustrate the application of the principles of the invention, it will be understood that the invention may be embodied otherwise without departing from such principles.

What is claimed is:

1. A device for applying a strand of filled casing from a portioning machine onto a rod-shaped carrier, comprising an eccentric carrier finger mounted for rotation about a longitudinal axis of the strand as it leaves the portioning machine for engaging the strand to turn the strand around the longitudinal axis, a feeder arm extending coaxially with the longitudinal axis and adjacent said finger for receiving turns of strand from said finger, arm displacement means connected to said feeder arm for moving said feeder arm toward and away from said carrier finger, carrier mounting means for holding a rod-shaped carrier under said feeder arm, and feeder means mounted for movement along said feeder arm for sliding turns of strand from said feeder arm onto a carrier held by said carrier mounting means under said feeder arm as said feeder arm is moved away from said carrier finger by said arm displacement means.

2. A device according to claim 1, wherein said feeder means is mounted for movement in opposite longitudinal directions along said feeder arm.

3. A device according to claim 1, wherein said feeder means comprises an endless rotating feeder element mounted for movement on said feeder arm.

4. A device according to claim 3, wherein said endless rotating feeder element comprises an endless chain having a plurality of spaced apart teeth thereon on at least a portion of the length of said endless chain, said teeth being adapted for engaging between turns of strand for maintaining a spacing between turns of strand as the strand is slid from said feeder arm onto a rod-shaped carrier.

5. A device according to claim 1, including carrier finger drive means connected to said carrier finger for rotating said carrier finger intermittently.

6. A device according to claim 5, wherein said carrier finger drive means is operatively connected to the portioning machine for intermittently rotating said carrier finger in time with the discharge of a selected number of portions of the strand leaving the portioning machine and engaging said eccentric carrier finger.

7. A device according to claim 1, wherein said arm displacement means comprises a geared motor for moving said feeder arm toward and away from said carrier finger cyclically or continuously.

8. A device according to claim 7, wherein said geared motor drives said feeder arm cyclically and includes a fast-cycle drive operatively connected to said feeder arm at an end of said feeder arm spaced away from said carrier finger.

9. A device according to claim 2, wherein said arm displacement means comprises a geared motor operatively connected to an end of said feeder arm remote from said carrier finger and an endless drive element connected between said geared motor and said remote end of said feeder arm.

10. A device according to claim 1, wherein said feeder arm has a free end adjacent said carrier finger, a rod-shaped carrier carried by said carrier mounting means having a free end adjacent said carrier finger, said free end of said feeder arm extending closer to said carrier finger than said free end of the rod-shaped carrier held by said carrier mounting means with said feeder arm in an initial position for receiving turns of strand from said carrier finger.

11. A device according to claim 1, wherein said carrier mounting means comprises a rotatably mounted disc-shaped support having an axis of rotation extending parallel to the longitudinal axis and parallel to an axis of a rod-shaped carrier carried by said carrier mounting means under said feeder arm.

12. A device according to claim 11, wherein said support includes at least two spaced apart seats lying on a circle centered about said axis of rotation of said support, each seat for receiving a rod-shaped carrier.

13. A device according to claim 12, including support drive means connected to said disc-shaped support for intermittently rotating said disc-shaped support for bringing each of said at least two seats in turn under said feeder arm.

14. A device according to claim 13, wherein said support drive means comprises a geared motor having a brake for driving said support and for stopping rotation of said support with a selected seat under said feeder arm.

15. A device according to claim 14, including a synchronous belt drive connected between said geared motor and said disc-shaped support for indirectly rotating said disc-shaped support.

16. A device according to claim 12, including carrier receiver means mounted adjacent said disc-shaped support for introducing a rod-shaped carrier into each of said seats.

17. A device according to claim 16, wherein said carrier receiver means includes a carrier holding member mounted for movement in a direction parallel to said longitudinal axis and mounted for rotation at right angles to the longitudinal axis for moving a rod-shaped carrier into engagement with a seat of said disc-shaped support, said carrier receiver means including a transfer device for supporting a plurality of carriers and for bringing carriers one at a time into a position for engagement by said carrier holder member.

18. A device according to claim 17, wherein said transfer device has an upper rod-shaped carrier support surface and lifting means for lifting said rod-shaped carrier support surface toward said carrier holding member for engagement by said carrier holder member of a carrier on said rod-shaped carrier surface, and delivery means connected to said rod-shaped carrier surface for moving said rod-shaped carrier surface and any carriers thereon toward said carrier holding member.

19. A device according to claim 18, wherein said delivery means comprises at least one endless belt movably mounted to said transfer device for movement toward said carrier holding member.

20. A device according to claim 19, wherein said delivery device comprises at least two spaced apart endless belts defining said rod-shaped carrier surface, said transfer device being positioned between said endless belts of said delivery means.

21. A device according to claim 18, including a stop connected to said delivery means for stopping movement of any rod-shaped carriers on said rod-shaped carrier surface as said delivery means moves carriers toward said carrier holding member.

22. A device according to claim 12, including locking means in each seat for locking a carrier to each seat.

23. A method of applying a strand of filled casing from a portioning machine onto a rod-shaped carrier, comprising rotating a carrier finger about a longitudinal axis of the strand as it leaves the portioning machine, the carrier finger being provided for engaging the strand and for turning the strand around the longitudinal axis, feeding the strand from the carrier finger onto a feeder arm extending coaxially with the longitudinal axis and adjacent the finger, the feeder arm thus receiving turns of the strand from the finger, mounting a rod-shaped carrier under the feeder arm and parallel to the longitudinal axis, retracting the feeder arm away from the carrier finger after it has received a plurality of turns of strand while the rod-shaped carrier is held stationary, and sliding turns of the strand off the feeder arm onto the rod-shaped carrier while maintaining a selected spacing between turns of the strand on the feeder arm and as the turns leave the feeder arm and are dropped onto the rod-shaped carrier.

24. A method according to claim 23, including receiving turns of the strand from the carrier finger onto the feeder arm while maintaining a selected spacing between the turns.

25. A method according to claim 23, including rotating the carrier finger intermittently so that an equal plurality of portions of the strand pass through the carrier finger and are included in each of the turns of the strand.

26. A method according to claim 25, wherein the plurality of portions of the strand is even.

27. A method according to claim 23, including carrying a plurality of rod-shaped carriers on a disc-shaped support all spaced apart and lying on a common circle centered around an axis of rotation for the support, rotating the support to bring a new carrier under the feeder arm after a previous carrier has received a selected plurality of turns of strand from the feeder arm.

28. A method according to claim 27, including feeding a plurality of parallel extending carriers lying side-by-side on a carrier support surface to a carrier holder, lifting the carrier support surface toward the carrier holder for engaging a carrier with the carrier holder and swinging the carrier holder with a carrier into engagement with the disc-shaped support for seating the carrier on the disc-shaped support.

* * * * *